United States Patent
Connolly et al.

(10) Patent No.: US 11,029,855 B1
(45) Date of Patent: Jun. 8, 2021

(54) CONTAINERIZED STORAGE STREAM MICROSERVICE

(71) Applicant: DataCore Software Corporation, Fort Lauderdale, FL (US)

(72) Inventors: Nicholas C. Connolly, Purley (GB); Robert Bassett, Pensacola, FL (US); Roni J. Putra, Pompano, FL (US)

(73) Assignee: DataCore Software Corporation, Fort Lauderdale, FL (US)

( * ) Notice: Subject to any disclaimer, the term of this patent is extended or adjusted under 35 U.S.C. 154(b) by 0 days.

(21) Appl. No.: 16/589,500

(22) Filed: Oct. 1, 2019

(51) Int. Cl.
*G06F 3/06* (2006.01)
*G06F 9/50* (2006.01)

(52) U.S. Cl.
CPC .......... *G06F 3/0613* (2013.01); *G06F 3/0653* (2013.01); *G06F 3/0659* (2013.01); *G06F 3/0683* (2013.01); *G06F 9/5011* (2013.01); *G06F 9/5077* (2013.01); *G06F 2209/5022* (2013.01)

(58) Field of Classification Search
CPC ...... G06F 3/0659; G06F 3/0656; G06F 3/061; G06F 3/0611; G06F 12/0871; G06F 16/178; G06F 2212/7207; G06F 3/0613; G06F 3/0653; G06F 3/0683; G06F 9/5077; G06F 9/5011; G06F 2209/5022
See application file for complete search history.

(56) References Cited

U.S. PATENT DOCUMENTS

| | | | |
|---|---|---|---|
| 6,530,043 B1 | 3/2003 | Beardsley et al. | |
| 6,732,124 B1 * | 5/2004 | Koseki | G06F 11/1435 |
| 6,732,125 B1 | 5/2004 | Autrey et al. | |
| 7,565,498 B1 | 7/2009 | Baird et al. | |
| 9,946,606 B1 | 4/2018 | Connolly et al. | |
| 10,003,636 B1 | 6/2018 | Connolly et al. | |
| 10,498,802 B1 | 12/2019 | Connolly et al. | |
| 2007/0100917 A1 | 5/2007 | Amano et al. | |
| 2007/0168403 A1 | 7/2007 | Meiri et al. | |
| 2007/0214334 A1 | 9/2007 | Maruyama et al. | |
| 2008/0243946 A1 | 10/2008 | Deguchi et al. | |
| 2009/0013012 A1 | 1/2009 | Ichikawa et al. | |
| 2010/0077173 A1 | 3/2010 | Rao et al. | |
| 2013/0042056 A1 * | 2/2013 | Shats | G06F 12/0871 711/103 |
| 2014/0074969 A1 | 3/2014 | Kadayam et al. | |
| 2014/0351545 A1 | 11/2014 | Nakajima | |
| 2020/0089614 A1 * | 3/2020 | Peng | G06F 12/0868 |

* cited by examiner

*Primary Examiner* — Ernest Unelus
(74) *Attorney, Agent, or Firm* — Michael Best & Friedrich LLP

(57) ABSTRACT

A containerized stream microservice is described. The containerized stream microservice is configured to provide the functionality of volume presentation along with all related interactions including the receipt and processing of IO requests and related services. The containerized stream microservice preferably implements stream metadata in the management of storage operations, and interacts with a store to provide underlying data storage. The store, which may also be referred to as a data store, is where underlying data is stored in a persistent manner. In one example, the store is an object store.

17 Claims, 19 Drawing Sheets

CONTAINERIZED STORAGE STREAM MICROSERVICE

This application relates generally to data representation and more particularly to a containerized storage stream microservice for such data representation.

BACKGROUND OF THE INVENTION

Application containers have been used to allow the deployment of corresponding functionalities without unduly consuming or wasting processing resources. Specifically, rather than requiring a full-fledged operating system for each application, the containers in an environment implement only the basic elements of the operating system in support of their runtime requirements, and also do so by sharing the resources of the underlying operating system.

The independent operation of an application container may be referred to as a microservice, since the container can provide its service independently and since it typically does so using minimal operating system resources. Respective microservices in an environment (e.g., cluster) can operate with other microservices using application programming interfaces. This arrangement allows the introduction of new services as interchangeable components in a fashion that is both flexible and efficient with respect to consuming additional operating system resources.

While application containers provide significant flexibility and efficiency, there remains a need for improved storage services. Object storage has been implemented, and provides enhanced flexibility. However, the object storage environment is relatively unstructured and does not inherently support a full range of storage services that are traditionally provided in block storage and file storage systems.

A containerized microservice that improves the depth and quality of storage services while retaining the flexibility and extensibility of the container environment is needed.

SUMMARY OF THE INVENTION

In one example, a containerized stream microservice is described. The containerized stream microservice is configured to provide the functionality of volume presentation along with all related interactions including the receipt and processing of IO requests and related services.

The containerized stream microservice preferably implements stream metadata (which may be referred to as a stream) in the management of storage operations, and interacts with a store to provide underlying data storage.

The store, which may also be referred to as a data store, is where underlying data is stored in a persistent manner. In one example, the store is an object store. In other examples, the store may be composed of other forms of virtually-presented storage devices that are, in turn, supported by physical storage devices.

In one embodiment, a method for data representation that is performed by the containerized stream microserevice comprises receiving write transactions directed to a given volume; and retaining stream metadata corresponding to the write transactions, the stream metadata identifying a sequence of the write transactions according to the order in which the write transactions are received for the given volume, and identifying respective location information for each of the write transactions, the location information including object identifiers respectively corresponding to the write transactions.

A stream image may also be associated to the stream metadata. The stream image providing a representation of the data in the given volume for a point in time by referencing a non-contiguous subset of the sequence of write transactions referenced in the stream metadata.

In addition to object identifiers, the stream metadata location information includes offsets respectively corresponding to each of the write transactions.

For example, the object identifiers include a first object identifier corresponding to a current object. Updating the stream metadata may then entail determining whether a current write transaction would exceed a capacity of the current object; and identifying a next object and updating the stream metadata to reference the next object for the current write transaction, where it is determined that the current write transaction would exceed the capacity of the current object.

Alternatively, updating the stream metadata may entail determining where a current write transaction would exceed a capacity of the current object; and updating the stream metadata to reference the current object for the current write transaction, where it is determined that the current write transaction would not exceed the capacity of the current object.

The present invention can be embodied in and in connection with various forms, including but not limited to business processes, computer implemented methods, computer program products, computer systems and networks, user interfaces, and application programming interfaces.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
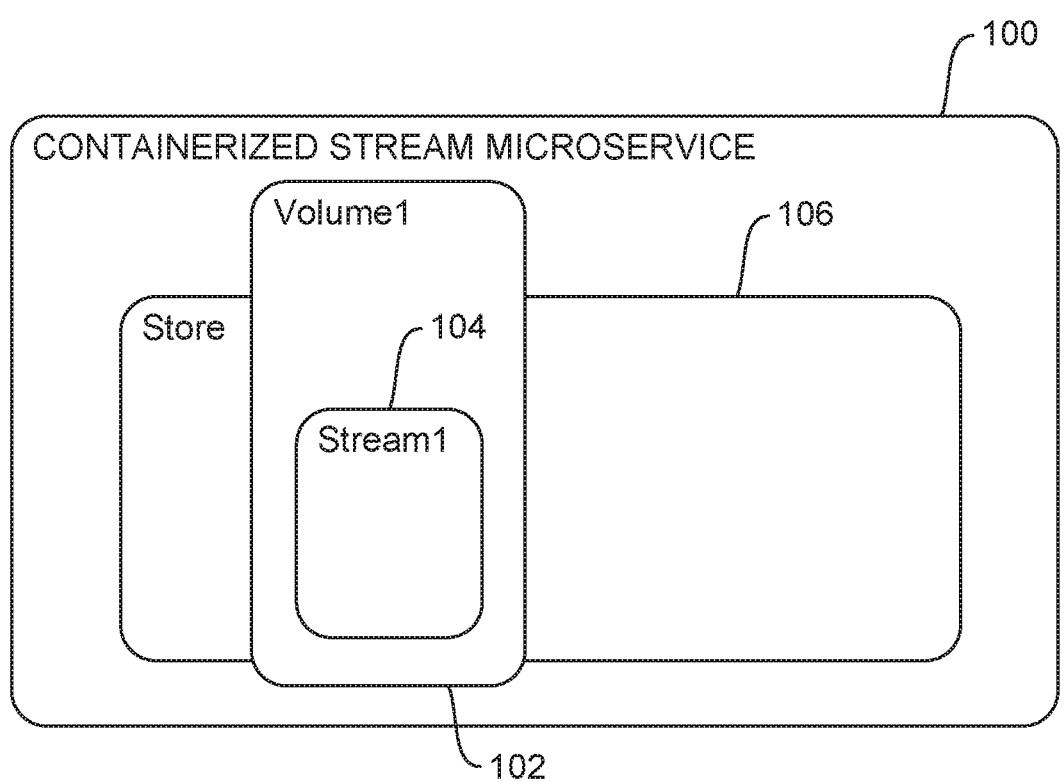
FIG. 1 is a block diagram illustrating a containerized stream microservice including a corresponding stream architecture.

FIG. 1 is a block diagram illustrating a containerized stream microservice 100 that includes a corresponding stream 104 architecture. The containerized stream microservice 100 provides the functionality of volume 102 presentation along with all related interactions including the receipt and processing of IO requests and related service. Preferably, the containerized stream architecture also implements a stream 104 in the management of storage operations, and interacts with a store 106 to provide underlying data storage.

The store 106, which may also be referred to as a data store, is where underlying data is stored in a persistent manner. In one example, the store 106 is an object store. In other examples, the store 106 may be composed of other forms of virtually-presented storage devices that are, in turn, supported by physical storage devices. The store 106 may also simply be physical storage devices.

Generally, the stream 104 is a readable and extendible history of all of the writes. Preferably, a time stamp is correlated to entries in the stream 104 (e.g., t0-tx) to assist in organizing the stream, and to provide an index into the stream. In object implementations, the stream 104 preferably includes object information including a key or other identification of the object(s) corresponding to the entries in the stream. A stream may be referred to as "active" or "open" when it can still be written to.

An image is a representation of data in a volume 102 that is made by reference to the stream. An image can be thought of as a "view" or an "index" into a stream, to facilitate certain types of accesses. The image may be generated by referencing metadata within the stream. The image may be stored for future use, or may be generated on demand, by referencing the stream including the metadata therein. Various different kinds of images may be provided, including a full image, a sparse image and a meta image. An image may be thought of as a time-based representation of a volume in the stream.

A volume 102 is the unit of presentation to client devices. Applications see and interact with volumes as their storage resources. In a containerized environment, an application container references a containerized stream microservice for storage resources. Consistent with the stream architecture, volumes may be composed of streams, images, and/or other volumes.

Figure 2:
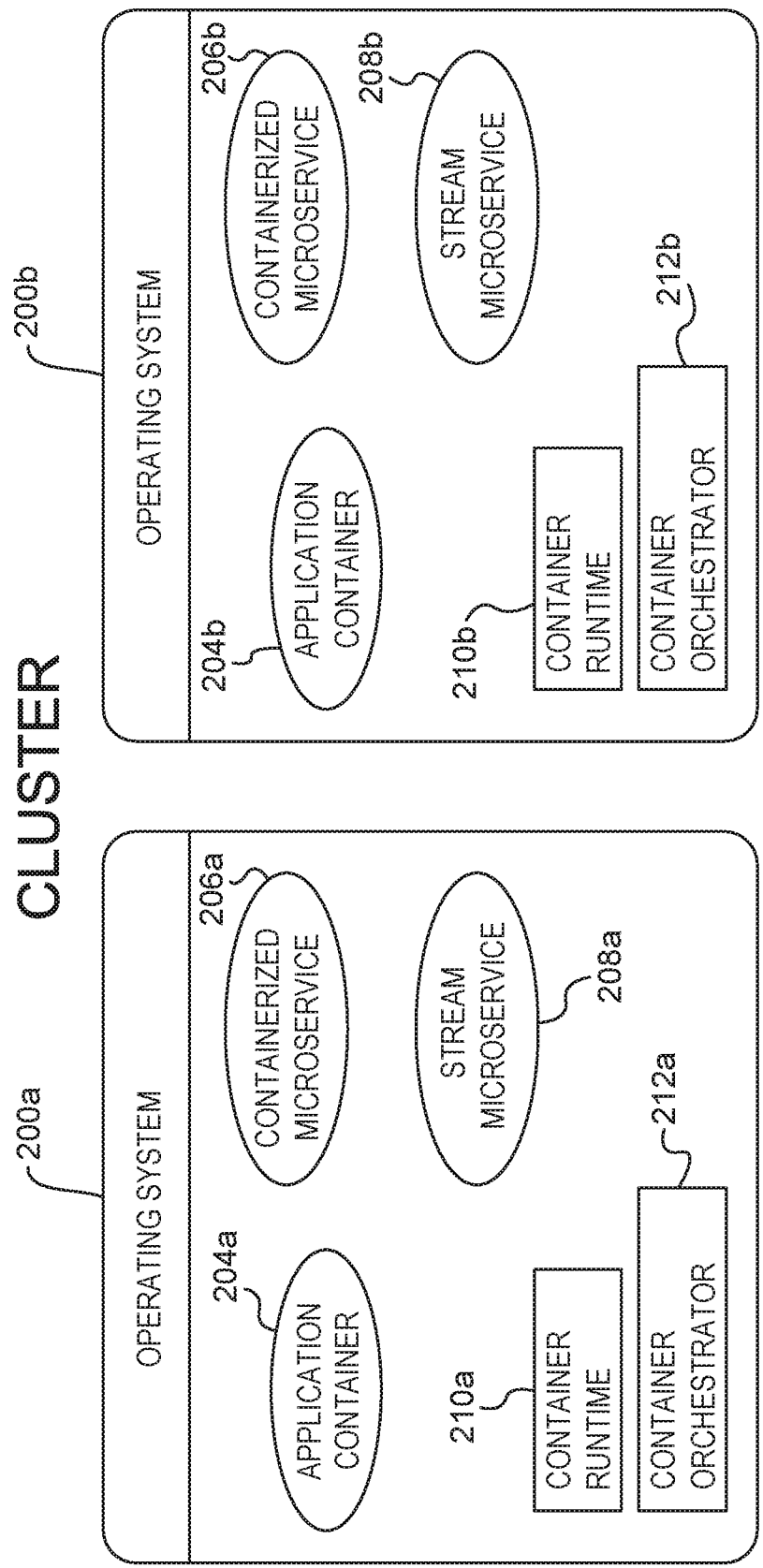
FIG. 2 is a block diagram illustrating a cluster of computing environments implementing the containerized stream microservice.

FIG. 2 illustrates a cluster of computing environments 200a-b implementing the containerized stream microservice 208a-b. The respective environments includes container orchestrators 212a-b that deploy and manage the corresponding container based applications, such as the application containers 204a-b, containerized microservice 206a-b and stream microservice 208a-b.

Each of the environments also includes a corresponding host operating system. Any type of operating system environment may be implemented to carry out the containerized stream microservice described herein, including but not limited to Microsoft, Apple, and Linux based operating systems. That is, the containerized stream microservice can run on any of physical, virtual or cloud infrastructures. Regardless of the type of operating system, the containers 204a-b, 206a-b, 208a-b preferably obtain basic services from the corresponding operating system kernel in a shared fashion. The container runtime 210a-b initializes the containers 204a-b, 206a-b, 208a-b and communicates with the kernel to start the respective containerized processes.

FIG. 1 also illustrates the relationship of a volume 102 and an associated stream 104 and data store 106. The volume 102, implemented by the stream 104, appears like a normal block device to an application container.

The store 106 may be thought of as the substrate of data storage where objects implemented in the architecture reside and persist. The store 106 may be constituted of physical media or may also be virtualized media (which, in turn, may have corresponding underlying physical storage, provided otherwise). The store 106 is intended to conceptually illustrate such a substrate, but it should be understood that it is not necessarily a single monolithic storage entity. Rather, the underling data store 106 may comprise an underlying hierarchical organization of storage, physical and/or virtual. In one example, as introduced above, the store 106 is an object store.

It is also noted that where physical storage resources are implemented, they may be variously embodied, including but not limited to hard disks, optical discs, tape, solid state memory, etc.

The stream 104 has the constituent components as described herein. It can be implemented in various forms of simple or complex data structure, including but not limited to tree structures, queue and stack structures, maps, etc.

With the containerized stream microservice (FIG. 1, 100; FIG. 2, 208a-b), the application containers 204a-b can be configured to see the volume 102 as a disk for the purposes of storage transactions, and interface with the volume 102 with respect to IO transactions without requiring the application containers 204a-b to have any need to know of or interact with the underlying specifics of the stream 104 or the store 106.

A volume 102 has the characteristics of a "normal" block device. It behaves like a disk in that it is block level oriented and is readable and writable. That is, when a client device writes "a" to block 0 and later reads block 0, the client device receives "a". When a client later writes "f" to block 0 and then reads block 0, the client receives "f" in response to the read, not the previously stored "a". However, the stream 104 includes additional functionality and characteristics beyond those of a normal block device such as a disk.

It is further noted that in FIG. 1, as in other figures of the same type in this description, the stream 104 is not encapsulated within the volume 102. The intent is to illustrate that the volume 102, which is accessible as a normal volume 102 by the application container, has an associated stream 104, with the stream 104 having the underlying data store 106 as a storage resource foundation.

Figure 3:
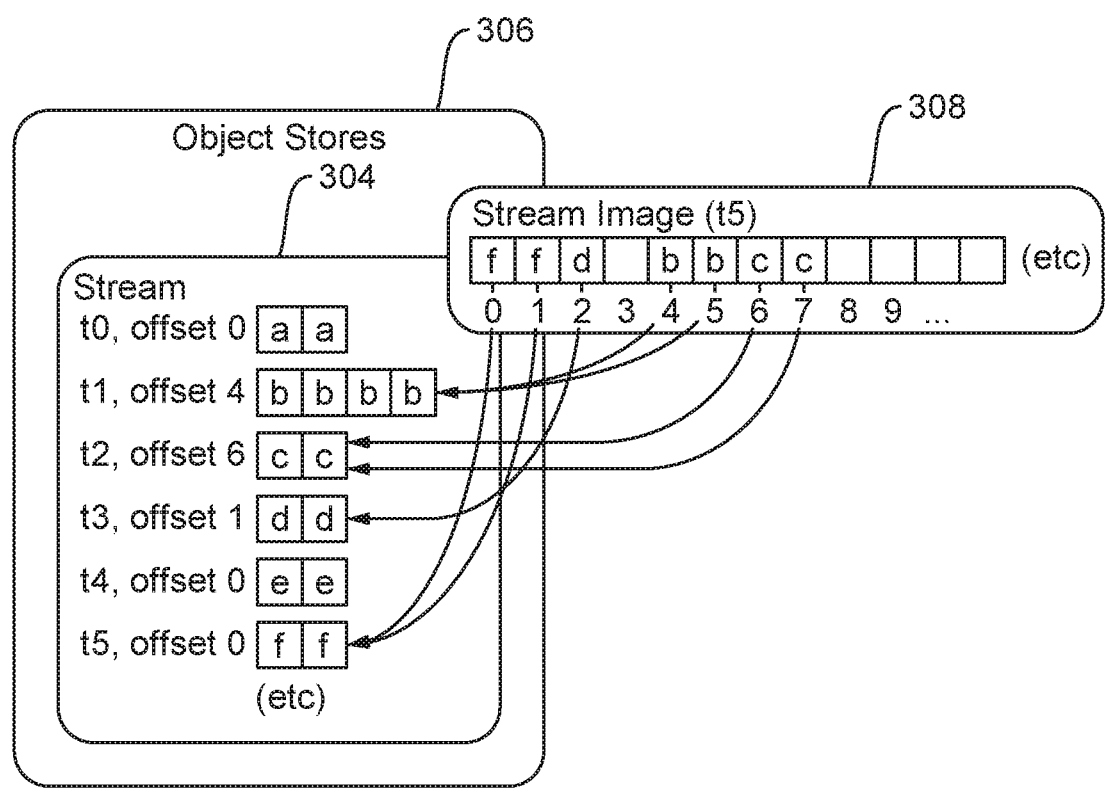
FIG. 3 is a block diagram illustrating a stream implemented on top of an object-based architecture.

FIG. 3 is a block diagram illustrating that the stream 304 is implemented using an object-based architecture. An associated stream image 308 illustrates that the stream 304 records changes and implements random read access for a version of a volume accessible by an application container.

The stream 304 maintains a recording of all changes to the volume. In one embodiment, if a block has never been written, then it defaults to all 0's (shown as empty blocks in the stream image 308). It should be understood that other default statuses, including but not limited to all 1's may be provided for blocks that have not been written.

The stream 304 is relatively simplified for ease of depiction, but generally it includes a sequence of the write transactions directed to the volume, with the write transactions in turn having differing numbers of blocks. For example, at t0 two blocks "a" are written to the volume and thus are also reflected in the stream 304 starting at offset 0. Similarly, at times t1-t5, a sequence of write transactions with differing numbers of blocks are reflected in the stream 304.

A stream image 308 references the stream 304 to represent the state of the volume at any point in time. In FIG. 3, the stream image 308 is a full image and shows the "current" state of the volume at time t5. However, a stream image can be constructed (and saved) from the stream metadata for any point of time that is represented in the stream 304. For a full image stream as of time t5, the state of the volume is obtained by progressing through the stream metadata (which points to the data in the stream), in reverse time order. For example, at time t1 the stream 304 records four blocks depicted as "b" starting at offset 4; at time t2 the stream 304 records two blocks depicted as "c" starting at offset 6, and so on. Progressing in reverse time order from timestamp t5 for a full image results in the stream image (t5) 308 as shown. In this fashion, the stream image is constructed from the stream metadata, rather than having to be constructed from the data.

In this fashion, the stream 304 maintains a recording of changes to the volume, including data that is ultimately overwritten, but any given image may be built or maintained with references that collectively represent the entire state of the volume at time tx.

Thus, the image 308 and the corresponding stream 304 can be used to recover, replicate or provide any variety of storage management functions for the corresponding volume at any given time t up through the time "now". The stream image 308 may be saved at any time, or may be generated by accessing the stream 304 after the fact (e.g., at time t5, without having retained the image for past time t3, one can retroactively generate an image for time t3).

Each change in the stream may have associated metadata. Typically, each write transaction will have a piece of metadata that is provided in the stream. Such a write transaction may of course include numerous blocks, meaning that a separate piece of metadata does not need to be maintained for every single block. This reduces overall overhead.

As such, the architecture provides for a retainable representation of the full version of the volume at any given time, even after the fact. The stream 304 allows recovery of the volume at any given time, and the image 308 compliments the stream 304 by providing a full representation of the volume at any time "t".

The stream and image scheme itself offers space reduction in that numerous instances of the image may be retained without requiring numerous instances of all the data on the volume to be replicated for each image. The metadata takes up some space, but it is a small fraction of the data payload. Additionally, a stream stores information for writes to blocks that are subsequently overwritten. This uses additional storage space; however, this additional storage is not "wasted" space. It has value, including provision for after the fact recovery as well as other features described further below.

Figure 4:
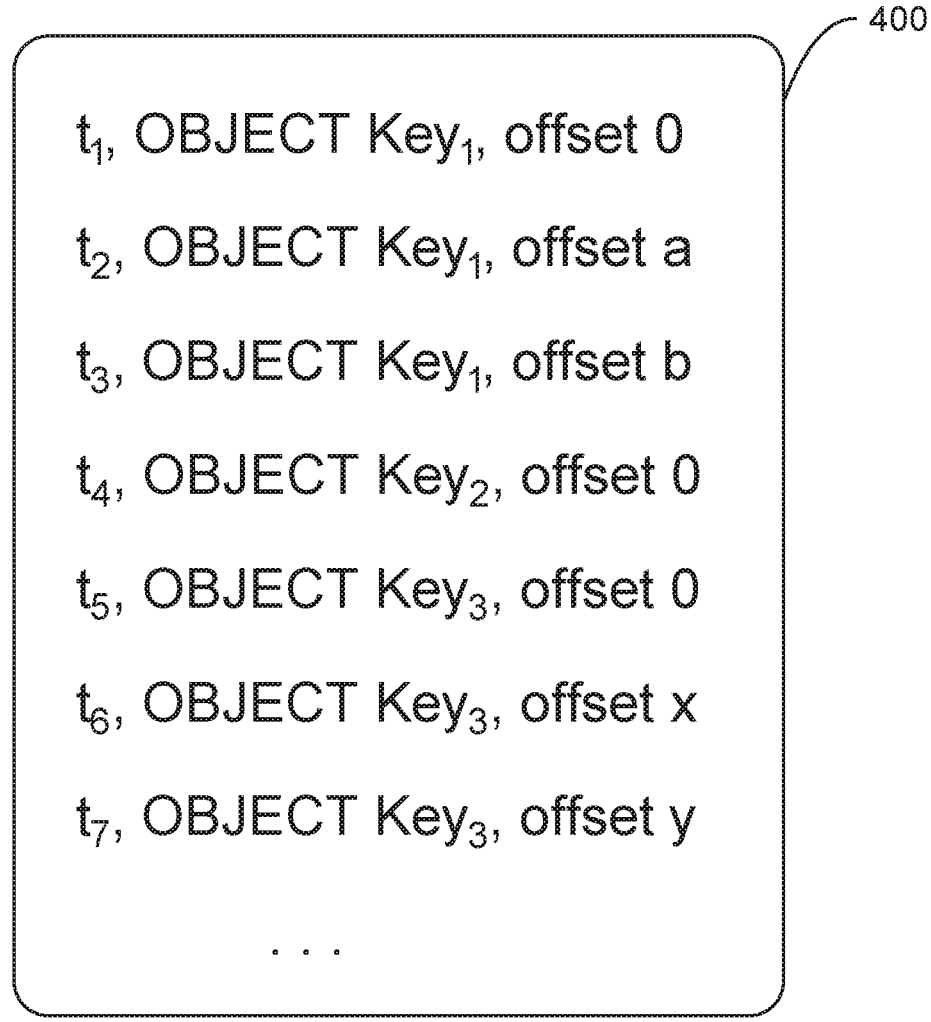
FIG. 4 is a tabular diagram illustrating an example of stream metadata.

FIG. 4 is a tabular diagram illustrating an example of stream metadata 400 configured to support operation in an object-based environment. The stream metadata 400 includes the timestamp, object key and corresponding offset. Typically, the amount of data that can be handled by an object significantly exceeds the amount of data that is found in an individual write transaction. Although a one-to-one relationship between write transactions and objects could be provided, this would be wasteful and would create excess object overhead data. Thus, preferably, the stream is configured to handle the sequence of write transactions directed to a volume at one level of granularity, and is also configured to handle the sequence of objects at another level of granularity. In one example, the stream writes are up to about 1 MB in size, and they are batched into objects of about 2 MB.

Figure 5:
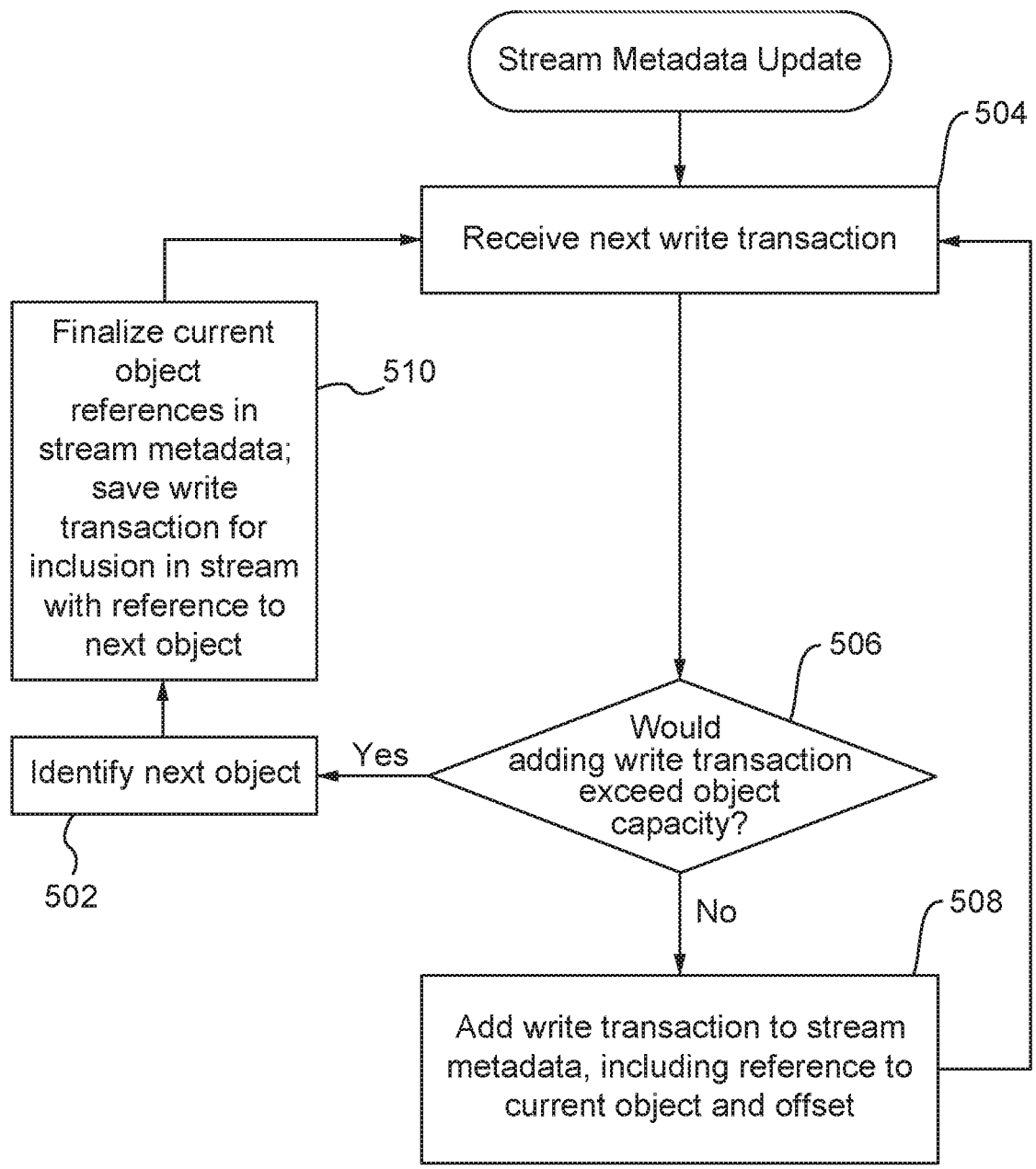
FIG. 5 is a flow diagram illustrating an example of updating stream metadata.

FIG. 5 is a flow diagram illustrating an example of updating stream metadata 500. The object information is part of the metadata. A given (current) object corresponds to one or more write transactions. As described above, typically the capacity of the object will exceed the sizes of individual typical write transactions. Thus, preferably, the updating of the stream metadata entails a coalescing of writes so they fit within prescribed size parameters corresponding to each object. The process of updating the stream metadata thus entails receiving 504 a write transaction, and then determining 506 whether the addition of that write transaction would exceed a threshold corresponding to the object (e.g., the default capacity of the object, or a predetermined value that is assigned to each object). Additionally, within a given object, each write transaction is assigned a corresponding offset. In this fashion, the metadata may be used to index any write transaction in the stream, even though the objects do not offer that level of granularity.

If it is determined 506 that the capacity (e.g., threshold) for the current object is not exceeded, then the write transaction is added 508 to the stream under the current object, including reference to the current object (e.g., key) as well as the offset for the individual write transaction. FIG. 4 offers a simple example of this, with write transactions at t1-3 being encapsulated within an object (object keys) at respective offsets.

If, however, it is determined 506 that the capacity of the current object would be exceeded, then a next object is identified 502. The current object is finalized 510 and the new (next) object is used to continue the stream with the write transaction assigned to the next object. Continuing with the example of FIG. 4, this is shown where the write transaction of time t4 is associated with next object key$_2$.

The stream metadata and the corresponding process provides a combination of the usefulness of the individualized write transaction information along with the flexibility, extensibility and convenience of the object store as the underlying data store.

The stream architecture may optionally implement an append scheme wherein when a space is overwritten on a volume, there is no overwrite in the associated stream. Instead, there is an append to the stream. This means that the stream may be embodied as a data structure, which can exist on Write-once media. This also means that the stream itself can be a type of Write-once media. That is, in some embodiments the stream architecture can be used to implement WORM devices.

Furthermore, a blockchain type approach can be used to guarantee the integrity of the history of the metadata. That is, sections of the metadata include the hash of the previous section and are hashed to verify the integrity of the stream.

Still further, in one example, the hash code is used as a seed for an encryption key for the data. With this additional measure, if the metadata is somehow changed and the hash code modified to appear correct, the data associated with the writes will still be inaccessible because it will have been encrypted with a different key.

It is noted that appending each write transaction to a single location is certainly not the only mechanism for maintaining the stream. The writes can be stored wherever is convenient, may be placed in arbitrary locations, and may implement a plurality of virtual or physical stores. However, whether in a linear append mode or an arbitrary allocation mode, the sequence of write transactions according to the order in which the write transactions are received for a given volume is retained. This maintenance of the sequence of write transaction is preferably performed within the stream itself, in the metadata.

The portion of the stream metadata that retains the write transaction sequence is preferably kept independently from the underlying data itself, particularly where an object store is the underlying data store.

Figure 6A:
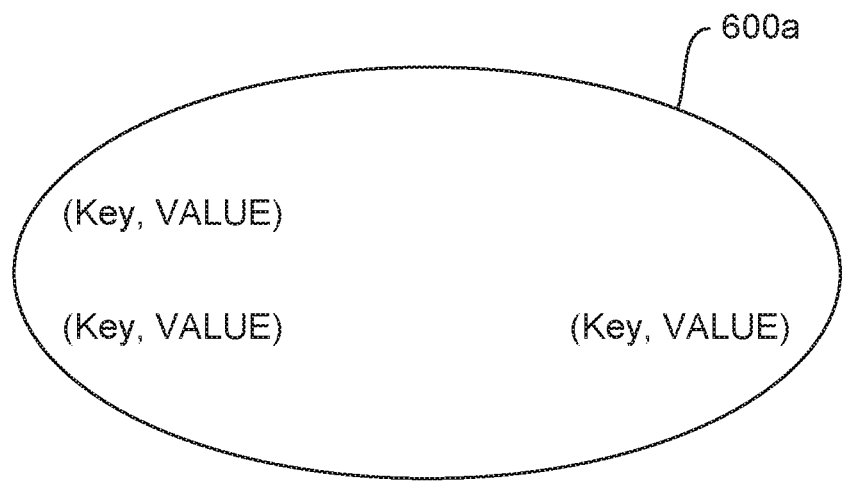
FIGS. 6A-C are diagrams illustrating examples of object store environments.
Figures 6B, 6C:
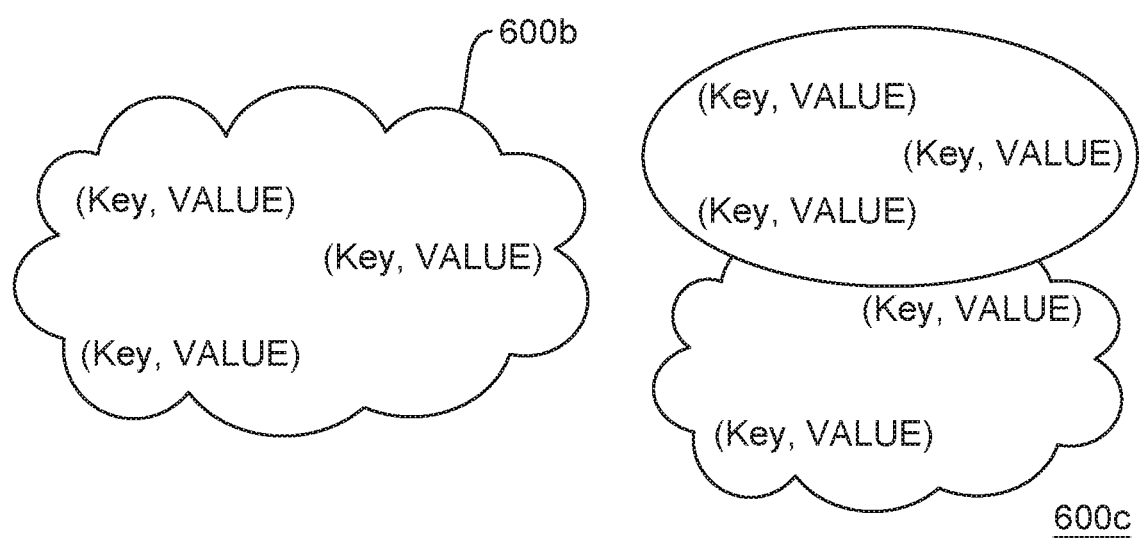

FIGS. 6A-C are diagrams illustrating examples of object store environments 600a-c. When the data store is embodied as an object store, the stream merely needs to point to the corresponding objects to maintain the coherency of the stream metadata. FIG. 6A generally indicates an object store 600a to include key and value information whereby the referenced object is identified by the key and contains the data (value). FIGS. 6B and 6C respectively illustrate that cloud resources may be readily implemented to provide the object store, whether the data store is solely resident in the cloud 600b or is provided as a combination of local and cloud-based resources 600c.

The stream implemented in the containerized stream microservice may be variously implemented to provide stream images, including full images, sparse images (changes from time tx through ty) and others. A full image (e.g., t5) acts as a snapshot as of that point in time and can be retained as such.

Figure 7:
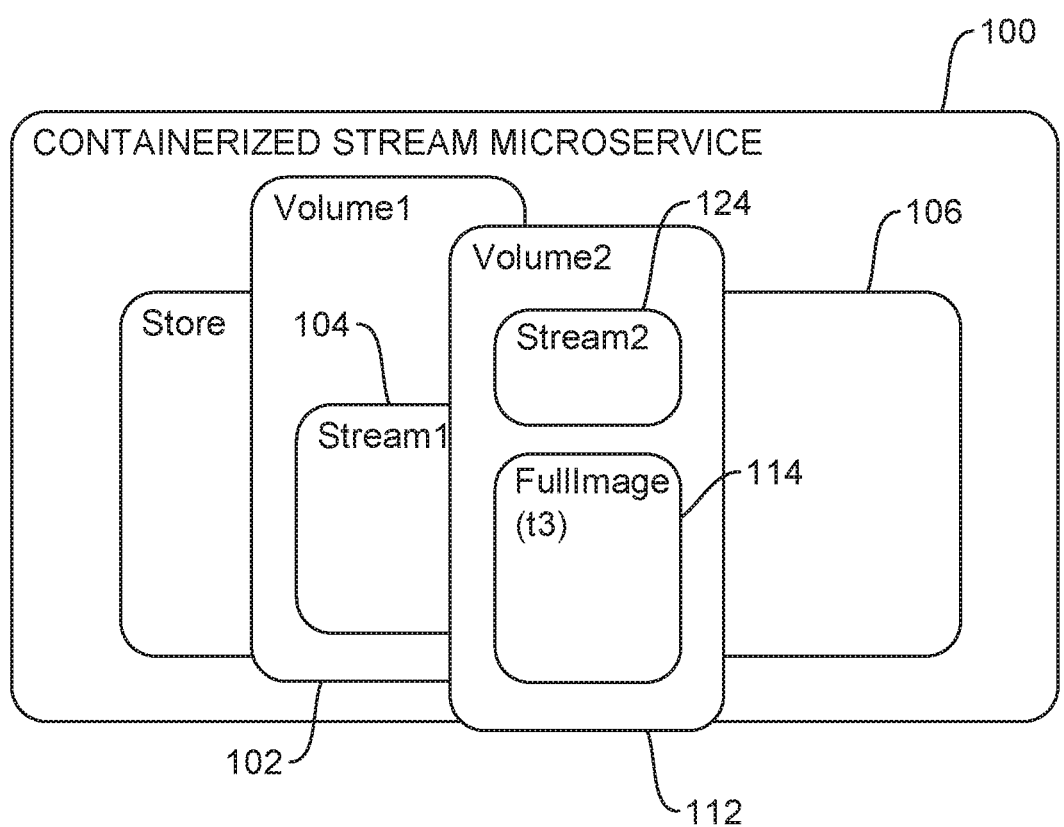
FIG. 7 is a block diagram illustrating a containerized stream microservice with multiple layered streams.

The containerized stream microservice is not limited to working with a single stream. Additional streams may also be created, and they may also be layered to provide other enhanced functions. FIG. 7 is a block diagram illustrating a containerized stream microservice 100 implementing a first stream 104 and a second stream 124 in one example of layering. The relationship of a first volume 102 and corresponding stream 104 and data store 106 are again illustrated. A second volume 112 is correlated to a second stream 124. Additionally, a full image (t3) correlating to the first stream provides a snapshot of the first volume 102 at time t3. The second stream 124 is then used to record write transactions to the second volume 112 that occur thereafter. In other words, the stream 124 records all of the changes that occur to the original volume using the representation of full image (t3) as a baseline. This provides a writable point in time volume, or a R/W Snapshot at time t3, in that the full image represents the point-in-time volume at time t3, and the overlaid stream 124 offers all of the write information directed to the second volume that occur after the point-in-time.

Figure 8:
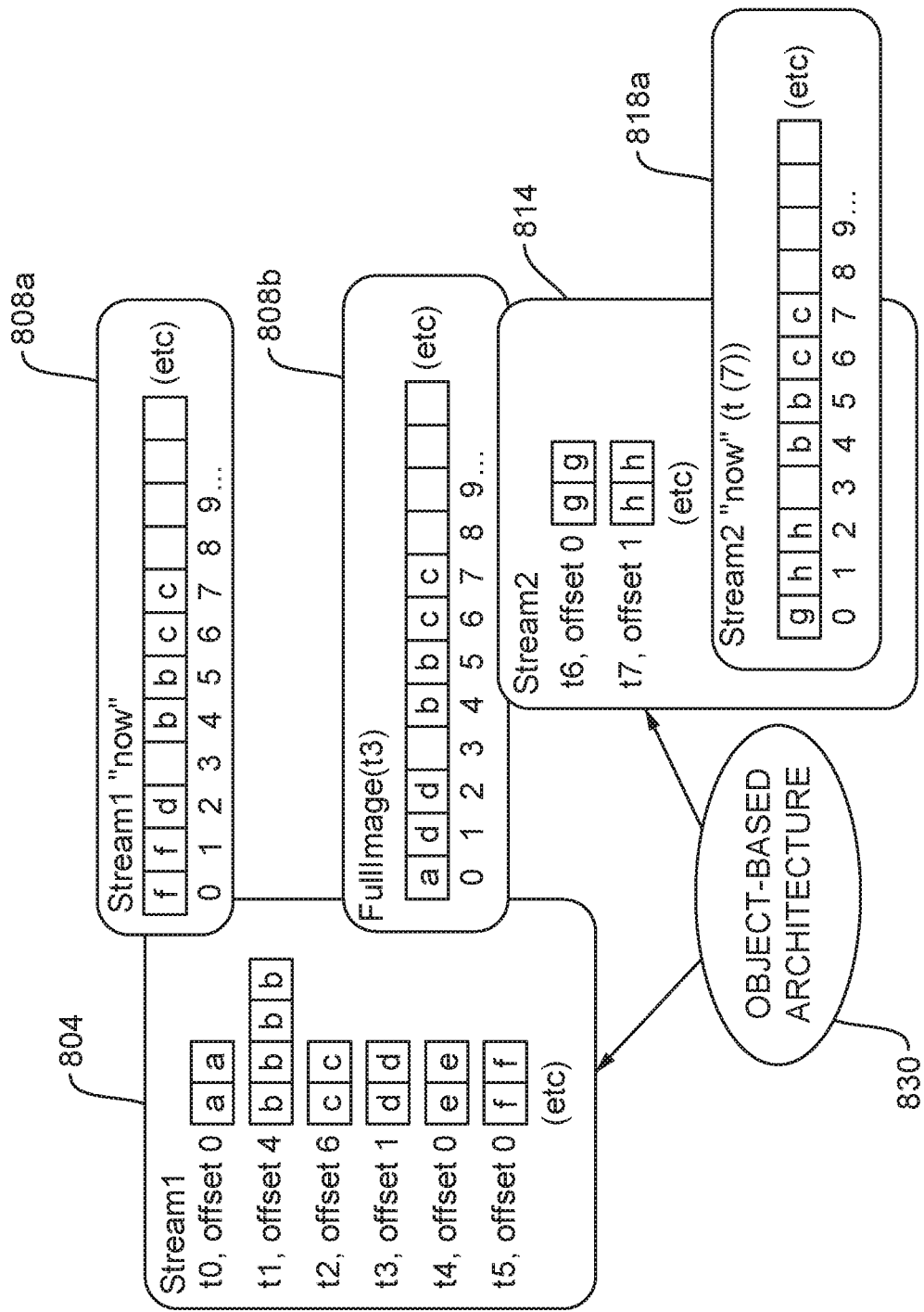
FIG. 8 is a block diagram illustrating multiple streams and corresponding images in an object-based architecture.

FIG. 8 is a block diagram further illustrating multiple streams 804, 814 that are managed within an object-based architecture 830, as well as the layering functionality.

For example, an application container writes to a first volume from time t0 to time t5. A full image may be taken at time t5, as shown in stream image 808a. Additionally, at some point in time after time t3, a full image at time t3 can be taken, as shown in stream image 808b. This provides an image, or snapshot, of the first volume as it existed at time t3.

Another stream 814 is then created on top of, or layered upon, the full image 808b. A second volume may be associated to this additional stream 814, and subsequent write transactions may then be directed to that volume and recorded in the additional stream. For example, the write transactions at times t6 and t7 are illustrated in the second stream. Another full image at time t7 can be taken, corresponding to this second volume/stream, shown as full image 818a.

Reads from the second volume may then use images 808b and 818a (as necessary) to access data corresponding to the second stream and (again, if necessary) the first stream. Writes to the new, second volume are simply appended to the second volume's stream 814. Writes to the original volume can also be appended to the original volume's stream 804, which does not affect the new stream 814.

As can be seen in FIG. 8, the stream architecture and its supported layering allow the blocks in offsets 4-7 ("b", "b", "c", "c") to appear in the time t7 image 818a even though stream 814 records only changes to offsets 1-2. FIG. 8 also further illustrates how layering supports provision of a R/W snapshot as explained for FIG. 7. Specifically, the full image for time t3 808b is retained (or generated after the fact) as an archived image from the first stream 804, and the second stream 814 records changes thereafter. It should be understood that the layering may continue. For example, a full image of the second stream 818a may be taken at time t7, and then a new third stream may be layered on top.

Figure 9:
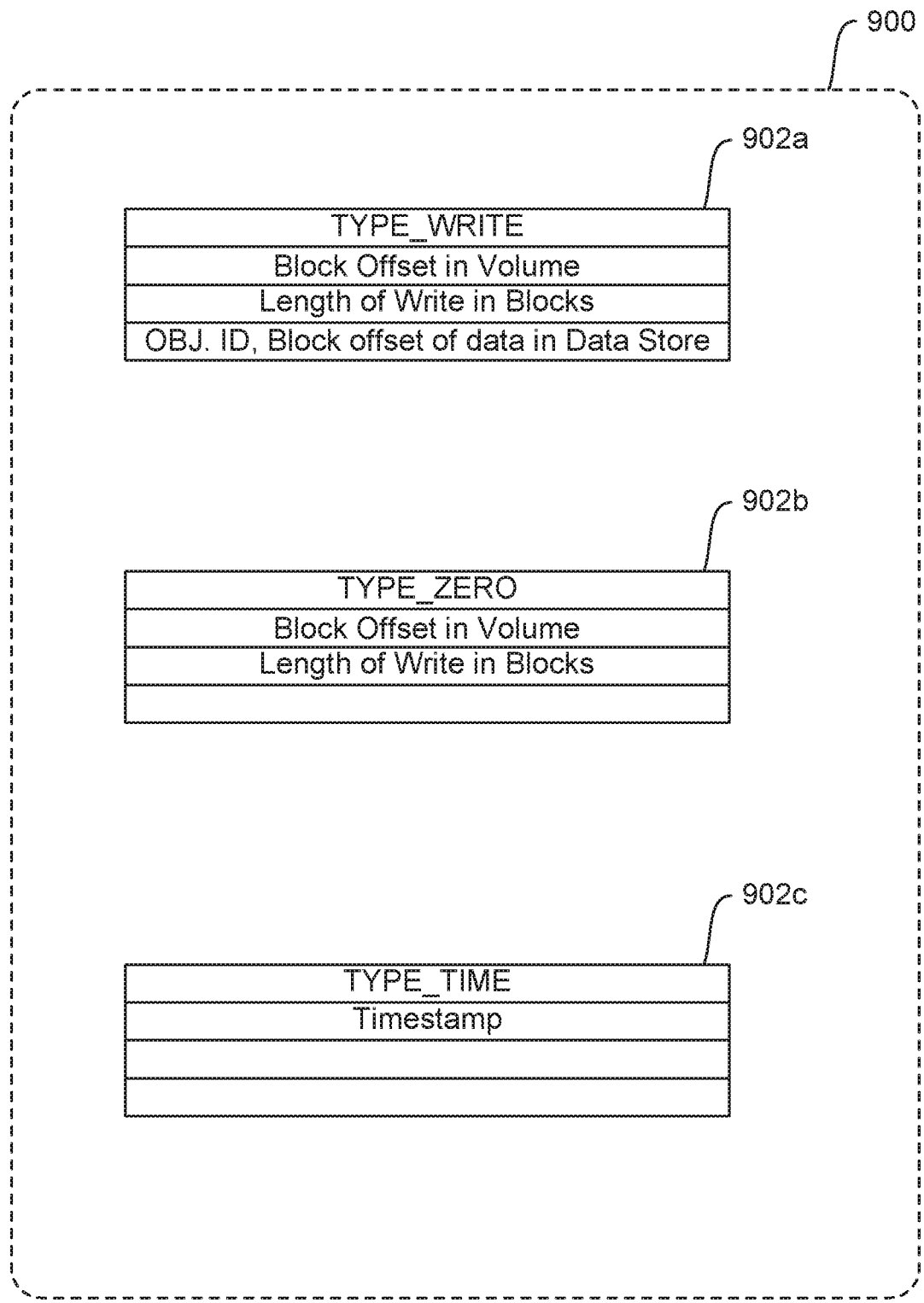
FIG. 9 illustrates examples of object-based architecture compliant stream metadata.

FIG. 9 illustrates examples of object-based architecture compliant stream metadata 900. In this example, the metadata 900 entries correlate to write transactions that respectively have numerous (and often differing numbers of) blocks. In this fashion, each write transaction has a "piece" of metadata, rather than requiring metadata for every block. Additionally, the example applies a timestamp only for a new write that has a different timestamp from the previous write, rather than requiring a potentially duplicative timestamp within the metadata for successive writes. Finally, the example comprises metadata that is of equal size, regardless of type. Various alternatives will be readily recognizable, with some specific examples offered below.

Portion 902a of the metadata 900 illustrates the building blocks for a typical write to the stream, denoted as "TYPE_WRITE". The metadata portion 902a includes an entry for the block offset in the corresponding volume, which is the block offset corresponding to the start of the write. Also included are the Length of the Write (in blocks), the Object Key (ID), and the Block Offset of the data in the data store. This metadata provides pointers to the object, as well as the offset within the object, as well an indication of the length of the write. The terms object ID and offset correspond to one preferred implementation but it should be understood that other techniques for identifying the location and size of the data may be implemented.

Another metadata portion 902b is denoted TYPE_ZERO. This type of metadata is used to provide an optimization wherein a write consisting of zeroes is recorded without requiring the corresponding zeroes to actually be physically stored. This can significantly economize on the use of storage for data in the stream.

The TYPE_ZERO metadata includes the block offset in the volume and the length of write in blocks, similar to that provided in the TYPE_WRITE metadata. However, it is not necessary to retain the Object ID and block offset in the data store, since physical storage is not required. Accordingly, this entry of the metadata is blank (as noted, in this example the types of metadata are of the same size). The usage of zeroes is purely by way of example. Additionally, the same principles may be applied to accommodate the same economization of storage where "ones" or other values are to be repeatedly stored.

Finally, a TYPE_TIME metadata portion 902*c* is a type of metadata that adds a timestamp to the stream whenever a write occurs unless the previous write had the same timestamp value. In this fashion, successive writes that essentially occur at the same time (according to the granularity of the time stamp) avoid additional metadata expense.

It should be appreciated that FIG. 9 depicts one example of a set of metadata, and that numerous alternatives are available. For example, (1) additional types of metadata may be included; (2) the metadata may omit the TYPE_ZERO or the TYPE_TIME types; (3) a timestamp could be included as an entry in every TYPE_WRITE instance of metadata; (4) characteristics other than object ID and offset may be used to define the location and size of data being stored. The artisan will readily recognize these and other potential options.

Figure 10:
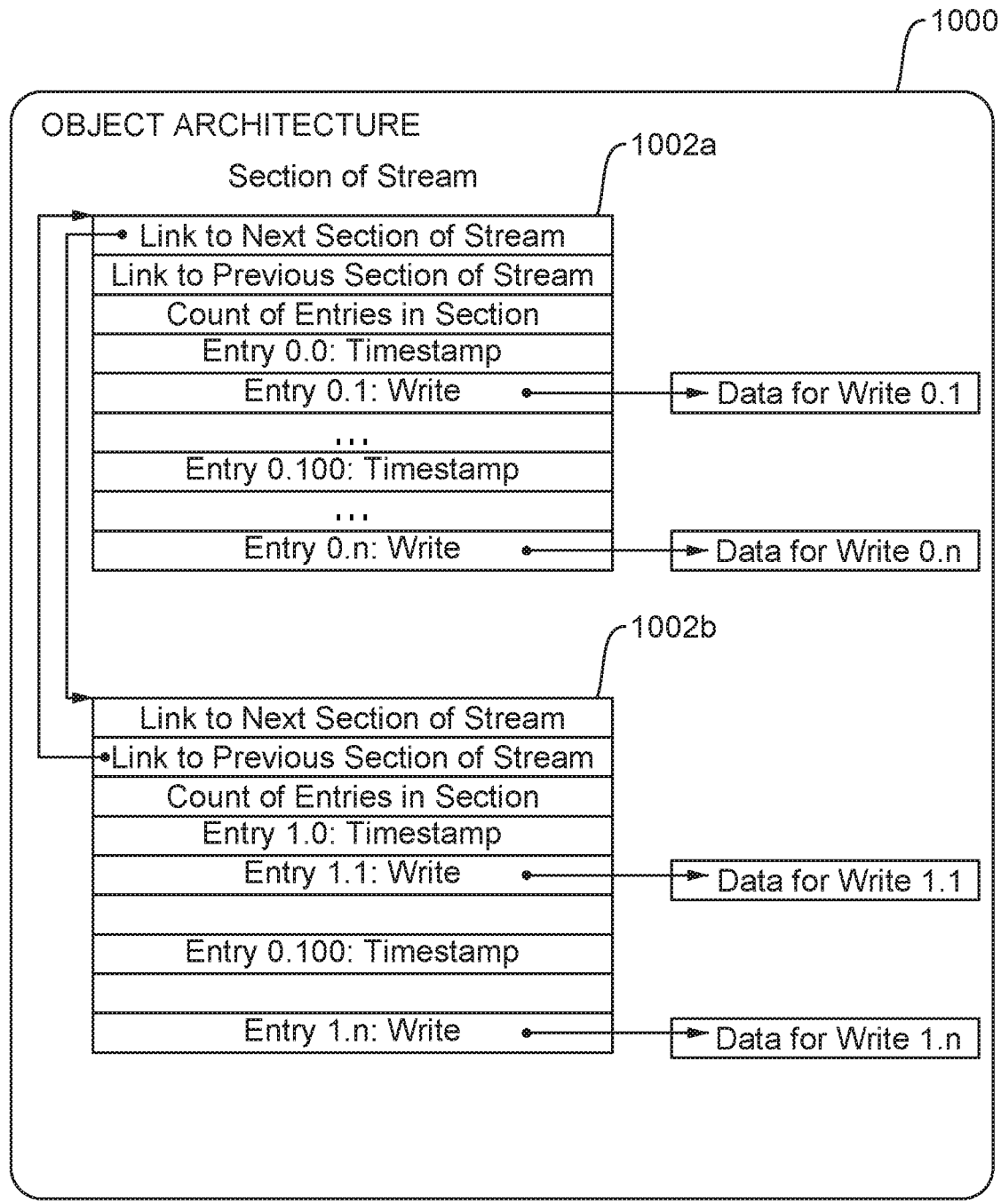
FIG. 10 is a block diagram illustrating an example of an object-based architecture compliant stream layout with multiple stream sections.

FIG. 10 is a block diagram illustrating an example of an object-based architecture based stream layout 1000 as well as the option of composing a stream of Sections 1002*a-b*. With the sectioning feature, portions of the stream are easily segregated. This is useful for managing the location of the constituent sections of the stream, particularly where different storage resources are implemented for different portions of the stream. The use of sections 1002*a-b* is optional, as a single stream layout may be provided without sectioning. A single stream layout option would include the features of either section 1002*a* or 1002*b*, without the links to other sections.

The sections 1002*a-b* respectively include Link to Next Section and Link to Previous Section entries to accommodate organization of the sectional relationship. The subsequent entry provides the number of entries "n" in the section 1002*a-b*.

Following this, any of the metadata types may follow, such as the indicated Entry 0.0, which is a TYPE_TIME or timestamp entry, following by Entry 0.1, which is a TYPE_WRITE, entry 0.2, which is also a TYPE_WRITE, and so on. The pointer from the TYPE_WRITE type entries is illustrative of the indication of the location of the data in the data store, with corresponding indicia of the Data for Write 0.1, 0.2, and so on through entry 0.n within Section 1502*a*, and Write 1.1 through 1.n within Section 1002*b*. It should be understood that the write transactions may be retained according to the linear append or arbitrary allocation modes as described previously. Either way, the stream layout 1000 illustrates an example of retaining the sequence of write transactions according to the order in which the write transactions are received for a volume.

Figure 16:
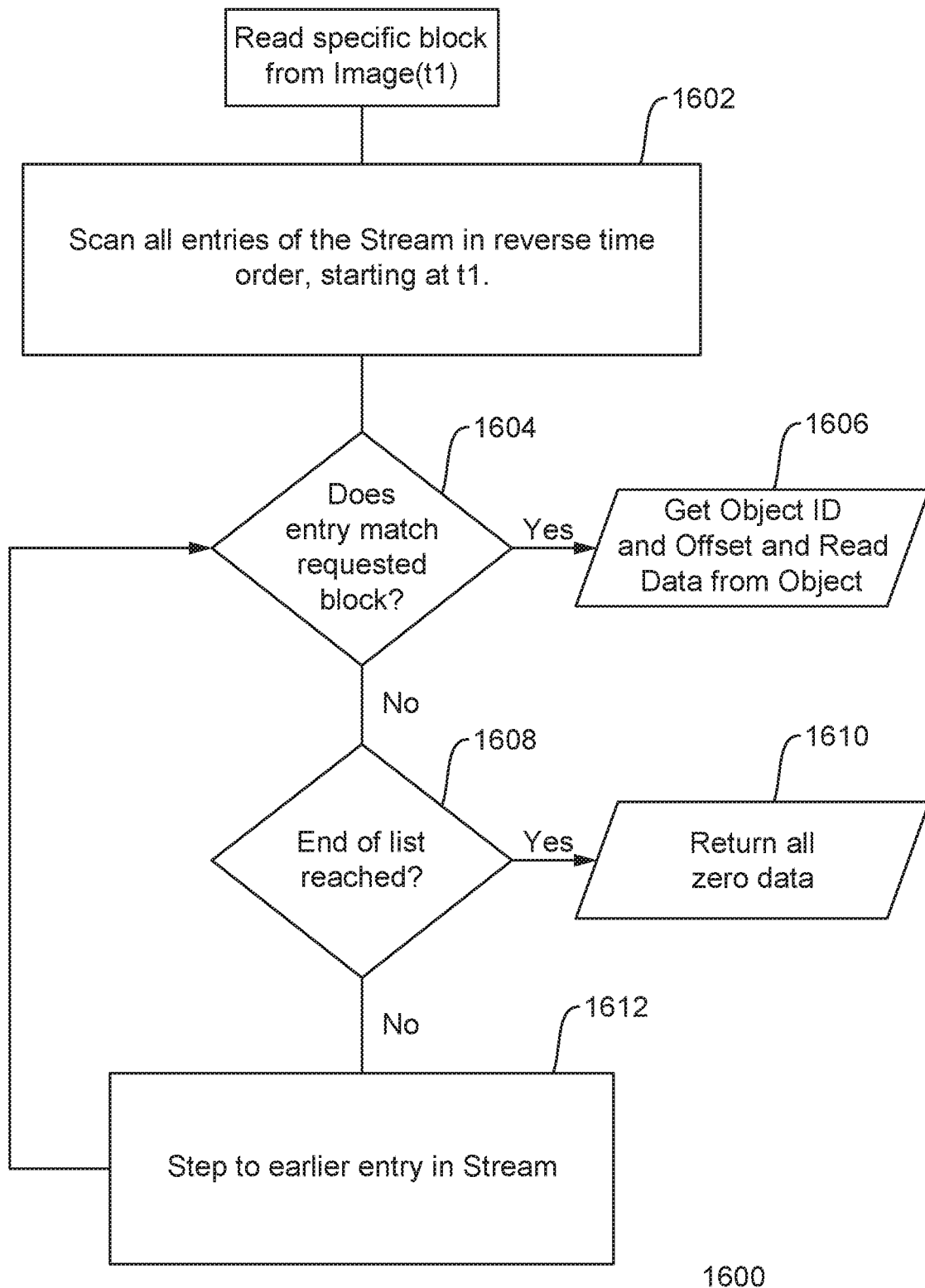
FIG. 16 is a flow diagram illustrating an example of accessing an image and reading a block.

FIG. 16 illustrates an example of accessing an image and reading a block of data. To carry out a read of a specific block in a volume, the specific block is identified according to the offset in the volume. All of the entries in the stream are scanned 1602 in reverse time order, starting at the time tx corresponding to the read (could be "now" or any valid intervening time value). This may optionally include navigation among multiple sections of the stream as described above, or with layering it may include navigation through multiple streams.

Within this scanning in reverse time order, matching 1604 entries are any entries in the stream referencing the same offset in the volume for the specific block being read. If there is not a match 1604, the process steps 1612 to earlier entries in the stream to progress through in the reverse time order. If there is no hit, and it is determined that there are no further entries in the stream 1608, then all zeroes are returned 1610. Once there is a "hit", in step 1606, the data block specified in the entry can be read by identifying the object ID and offset and then reading the data from the object.

A write may correspond to multiple blocks. For a write, an object is initially allocated from the data store according to the requested write, and the data is written to the allocated object. If desired, a write zero scheme may be implemented, using metadata such as the TYPE_ZERO type as described above. In such a scheme the zeroes are not actually written to the data store. The stream metadata is updated to reflect the timestamp, object key, offset, and write length data. Once the new object key is allocated, the write is appended to the object until it reaches capacity. The underlying object store manages the correspondence to disk.

Figure 11:
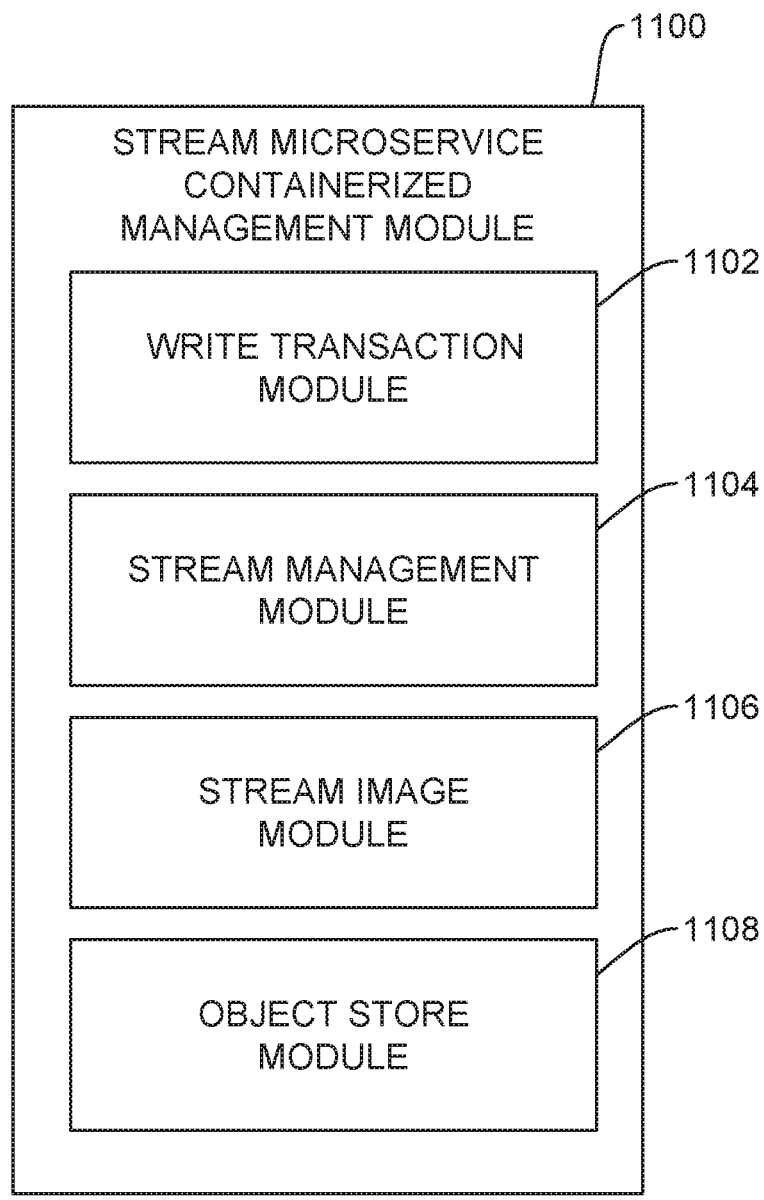
FIG. 11 is a block diagram illustrating an example of a computer system configured to include a containerized stream microservice.
Figure 12:
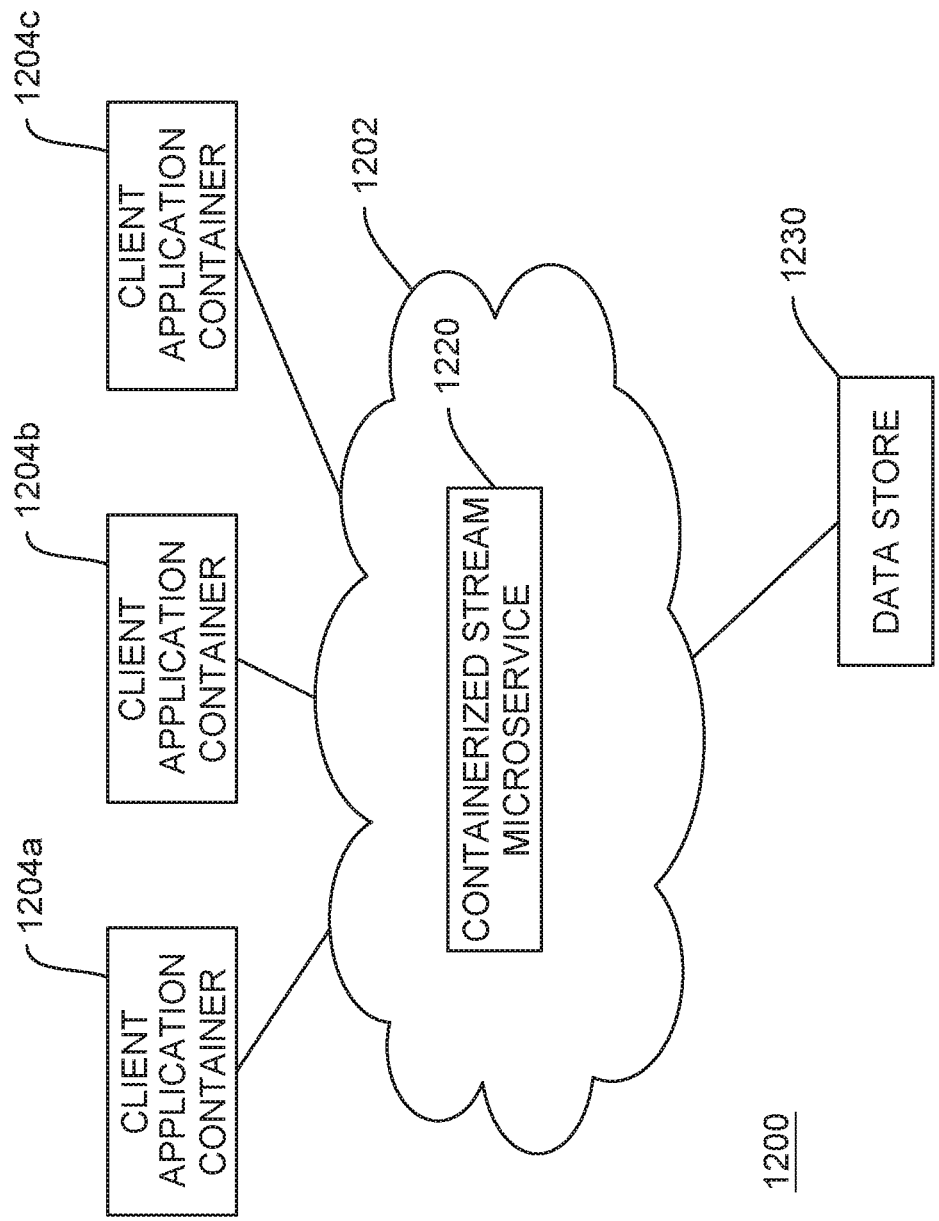
FIG. 12 is a schematic diagram illustrating a containerized stream microservice environment.

FIG. 12 is a schematic diagram illustrating a containerized stream microservice environment 1200, and FIG. 11 is a block diagram illustrating an example of a computer system configured to include a containerized stream microservice management module 1100.

Referring first to FIG. 12, a containerized stream microservice 1220 has a corresponding run time environment 1202 such as described in connection with FIG. 2 above. The containerized stream microservice 1220 receives and responds to storage requests from the client application containers 1204*a-c*, and is also in operative association with the data store 1230, which as explained may be physical storage devices or virtual storage devices, and in one preferred example is an object store.

The run time environment 1202 may be variously supported. Essentially, it may be any computing platform including dedicated hardware, cloud computing resources, etc.

The containerized stream microservice 1202 provides the stream/object functionality described herein. Specifically, the containerized stream microservice may present virtual volumes to the application containers 1204*a-c*, receive read and write requests from the application containers 1204*a-c*, create, maintain and manage the stream, and engage with the data store to provide the described functionality.

FIG. 11 illustrates an example of a containerized stream microservice module 1100 in more detail. Specifically, the containerized stream microservice module 1100 includes a write transaction module 1102, a stream management module 1104, a stream image module 1106 and an object store module 1108.

The write transaction module 1102 receives writes directed to volumes presented to application containers, and the stream management module 1104 is configured to manage the retention of the stream based upon the received write transactions corresponding to any given volume. The writes can be stored wherever is convenient, may be placed in arbitrary locations, and may implement a plurality of virtual or physical stores. Preferably, the data store is an object store as has been described. Whether writes are simply linearly appended or arbitrary allocated, the sequence of write transactions according to the order in which the write transactions are received for a given volume is retained. Additionally, the stream is preferably retained as metadata separate from the actually-stored data, although they may also be retained together.

The stream image module 1106 associates stream images to the stream. The various types of stream images are described above. Generally, a stream image provides a representation of the data in a given volume for a point in time by referencing a non-contiguous subset of the sequence of write transactions in the stream. Noted examples include full and sparse image representations of the data in the given volume. Layering of stream images is also provided as described previously. Finally, any given stream image may be generated for the point in time retroactively, to accommodate retrieval of the full (or other) representation of the data in the given volume at a time after the point in time has passed.

The object store module 1108 interfaces with the data store and manages updates to existing objects and the instantiation of new objects as writes are received, potentially coalesced, and reflected in the stream. Similarly, the object store module 1108 provides coherent access to object(s) based upon read requests.

The containerized stream microservice module 1100 is preferably provided as software, but may also implement hardware, firmware, or combinations of software, hardware, and/or firmware. It may be stored in memory and execute on a conventional processing platform as shown and described. The program code to provide the module may also be stored in non-volatile memory including but not limited to hard disks, optical disks, flash drives, or any non-transitory computer readable medium.

According to one aspect, this document describes a node-based virtualization system suitable for implementing the containerized stream microservice. In one example, each node in the system has the ability to coherently present and maintain virtual volumes that may be presented to a host accessing any node in the system. Virtual volume coherency extends across all nodes, any node may be arbitrarily accessed for IO transactions, and any node has the ability to cache underlying data coherently for the presented volume(s).

Cloud systems purport to provide storage or the like, and to allow access from various locations. However, the various locations through which a user may access data in the cloud are merely conduits to some other location where the data is stored. The access locations themselves have no conception of volume coherency or the corresponding data, other than perhaps the pieces of data transferring through the local conduit.

The containerized stream microservice is particularly suitable for a node-based virtualization system in support of providing robust, flexible and manageable presentation of storage. If a first node fails, a second node is completely accessible to accommodate an IO transaction. Numerous nodes can be provided in a given system, and any number of nodes may be used for asynchronous replication as desired. Additionally, the nodes do not have to be homogenous. However, it is preferred that each node in the system have the capability of receiving access, responding to IO transactions, and maintaining volume coherency.

Figure 14A:
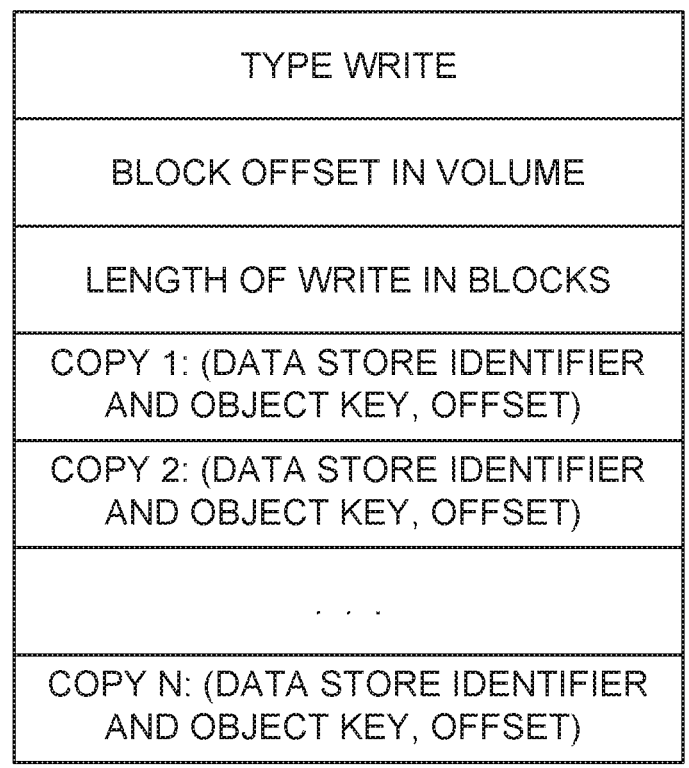
FIGS. 14A-D illustrate examples of metadata useful in a containerized microservice environment that implements an object-based architecture.

FIG. 14A illustrates an example of metadata 1400a that is used to manage IO transactions in the node based architecture. In one embodiment, each node may host one or more data stores that correspond to where underlying data is stored. A data store identifier identifies the data store itself. As described, each data store is preferably an object store. In that example, the object is then identified (object key) along with the offset within the object to point to the write transaction. Typically, each write transaction will have a piece of stream metadata. Such a write transaction may of course include numerous blocks, meaning that a separate piece of metadata does not need to be maintained for every single block.

In particular, FIG. 14A illustrates metadata for a typical write to the node architecture, denoted as "TYPE_WRITE". The metadata includes an entry for the offset in the corresponding volume, which is the offset corresponding to the start of the write in the volume context. Also included is the Length of the Write (e.g., in blocks). This metadata provides pointers to the start of the write in the volume and the data store, as well an indication of the length of the write. The terms block and offset correspond to one preferred implementation but it should be understood that other techniques for identifying the location and size of the data may be implemented.

There are also one or more entries that respectively include the Data Store identifier, Object Key and Offset information for copies 1 through N of the write transaction.

The architecture provides for a retainable representation of the full version of the volume at any given time, even after the fact. This allows recovery of the volume at any given time and corresponding to definable level of granularity that will extend throughout the node based architecture. Thus, the system maintains a full record of write transactions down to the granularity of any time "t".

The node architecture offers space reduction in that numerous coherent representations of a volume (at various states) may be retained without requiring numerous instances of all the data on the volume to be replicated for each representation.

It should be noted that the data store identifiers may also be implemented with a bitmap and per-volume list of data stores. Each node manages the data stores at its local location. However, there is a replication of the metadata that preferably extends throughout the nodes in the node based architecture described further below.

Figure 14B:
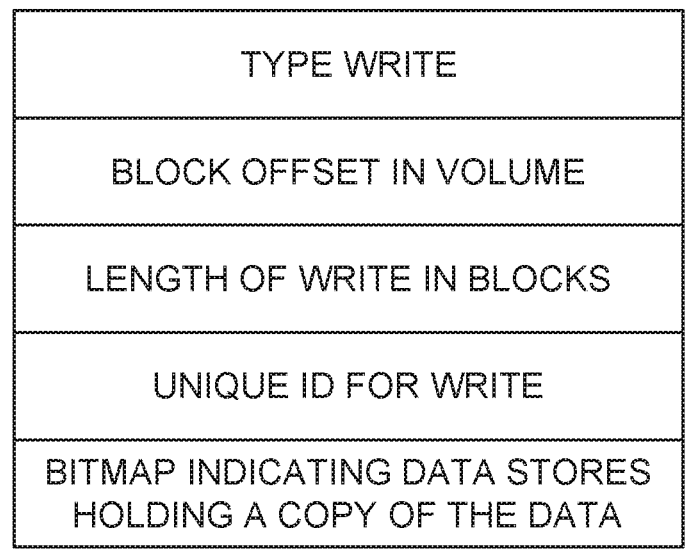

The example of FIG. 14A implies a variable sized list of data store and location pairs, but this may be implemented in a more space efficient manner using a Unique Id for each transaction and a known set of data stores as illustrated in FIG. 14B (1400b).

As another alternative, the Unique ID for the write is determined directly from the ordering of the metadata. In this example, a separate table of known data stores associated with this volume would be used.

During the write phase the metadata is created to reflect the writes that occur synchronously. For example, if a write is synchronously added to two data stores then the list will contain two entries. Once the synchronous process associated with the write has completed the I/O can be acknowledged to the host.

A separate asynchronous process is responsible for copying the data to additional data stores as required and updating the meta-data accordingly.

A periodic process is responsible for maintenance of the metadata, including but not limited to the removal of redundant write entries and reducing the number of copies for historic writes.

Figure 14C:
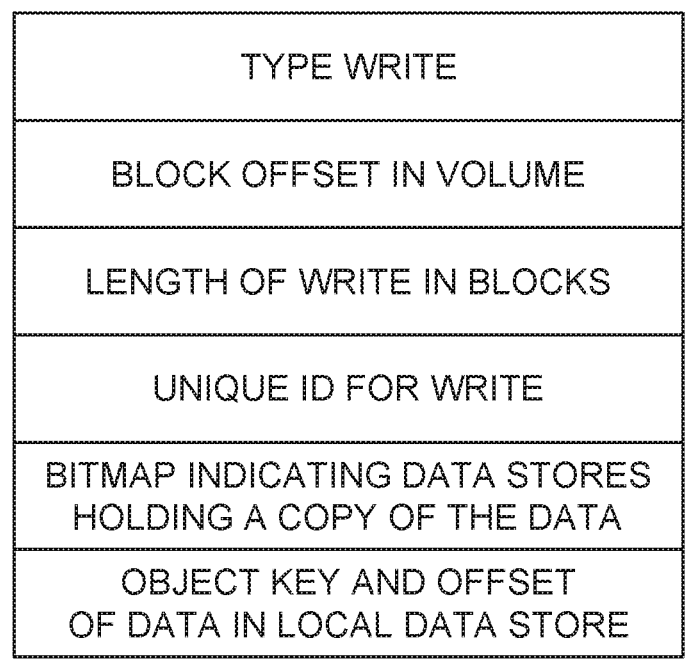

FIG. 14C illustrates still another example of metadata 1400c. In the general case the above description stores (Object Key, Offset) in Local Data Store for each copy of the data.

An alternative is to store just a list of nodes (or a bitmap) and have a Unique Id that represents the write transaction (whether expressly or implied). So, the query to another node provides data for Unique Id. This raises the issue of determining how the other node translates Unique Id into a specific location within its Data Store. One possible solution is to include the location within the meta-data stored on that specific node (so each node would have a different value in that field of the meta-data) as illustrated in FIG. 14C. However, an issue that arises with this solution is it assumes that a given node will only have one copy of the data, which may not be desirable. Accordingly, it may be preferable to keep the metadata defined in terms of the list of ((Object Key, Offset) within the Data Store) pairs.

Figure 14D:
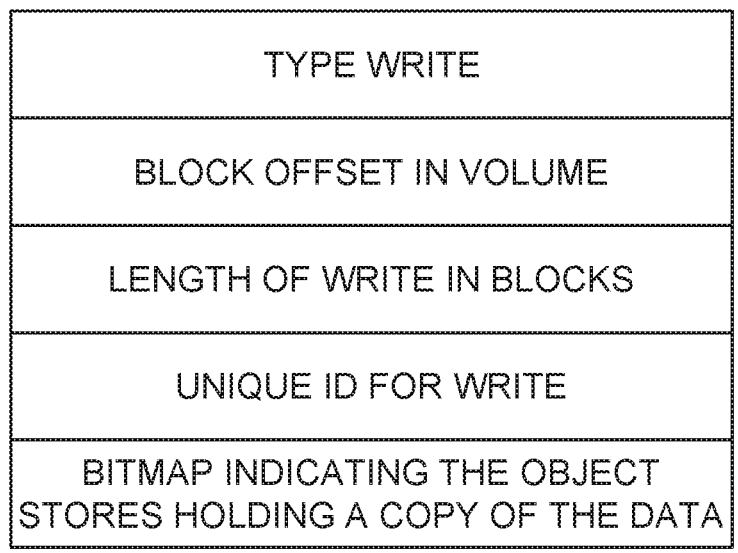

FIG. 14D offers still another example, wherein the Object Store is relied upon for managing the locations of the writes. Here, the Unique ID can be used to construct the Object ID.

Figure 13:
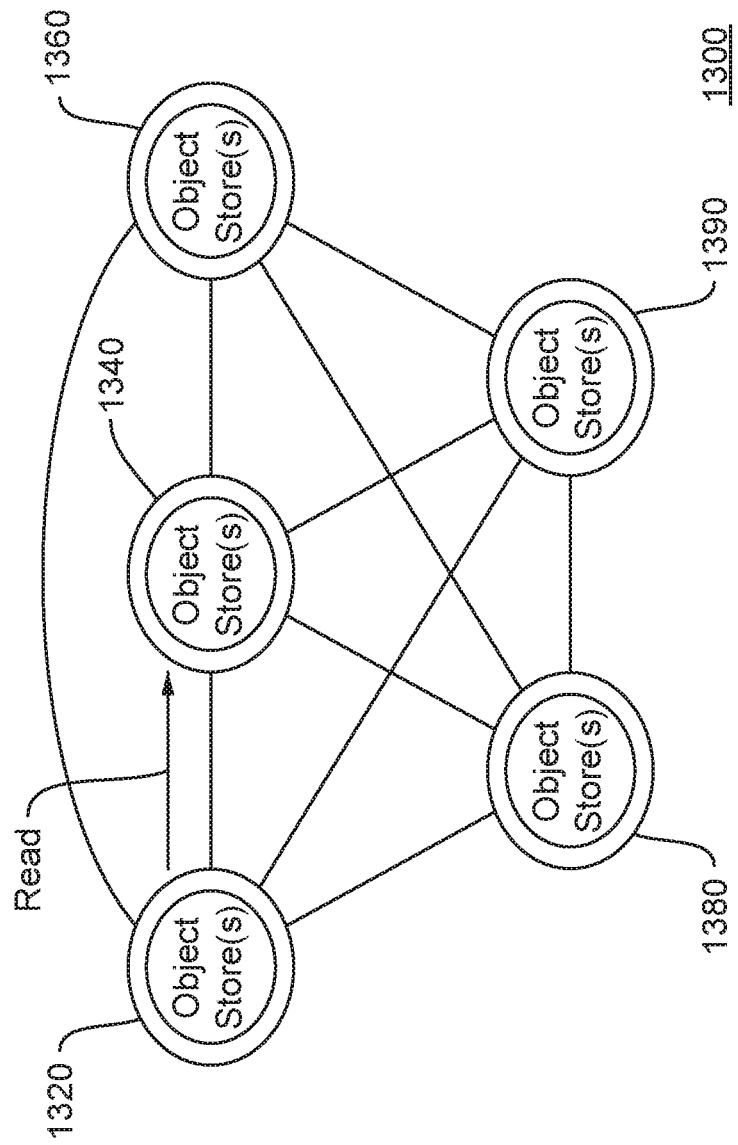
FIG. 13 illustrates an example of a node architecture and constituent nodes for use in a containerized stream microservice environment.

FIG. 13 illustrates an example of a node architecture and constituent nodes (1320, 1340, 1360, 1380, 1390). Although five nodes are illustrated, greater or fewer nodes may be provided depending upon the application and other considerations. Each node includes one or more object stores as described above. The respective nodes can access one or more object stores as necessary.

Referring to FIGS. 13 and 14A-D together, essentially the system records the node identifier for each copy of the write. Additionally, in one example, instead of per-volume mirror mappings among the nodes, a per-node interconnect among the nodes may be provided as illustrated.

In one example, IO operations are carried out as follows.

For read transactions, when the IO request arrives, the metadata is accessed to determine which node(s) the data is on and the IO is issued. This may be based upon various criteria, such as highest performance source based upon locality and class of service.

It is noted that a disk block cache may be provided at one or more of the nodes, and that such a cache may be used to satisfy read requests. A "primary" node that manages the storage of the underlying data remains identified in the metadata, and volume coherency is retained because the metadata extends throughout the system. Thus, the node provides immediate (cache) responsiveness to the read without compromising the coherency of the volume to which the read is directed.

For write transactions, since any given node has a coherent representation of the virtual volume, the write may be directly made at the node receiving the request (with the metadata updated accordingly).

Of course, mirroring may be implemented, such that the write is also copied to another node. However, from the perspective of the host, the IO transaction is simply directed to the virtual volume presented by the node, without concern as to where the data is actually ultimately stored. Additionally, if a node acting as a mirror is down, another node may be used as a second instance of the written data. There are thus two stable copies of the data underlying the write transaction and there would be no need to do volume recovery later. Still further, if the node acting as the mirror returns to service, the second copy may be instantiated at that node, and the metadata updated accordingly.

Figure 15:
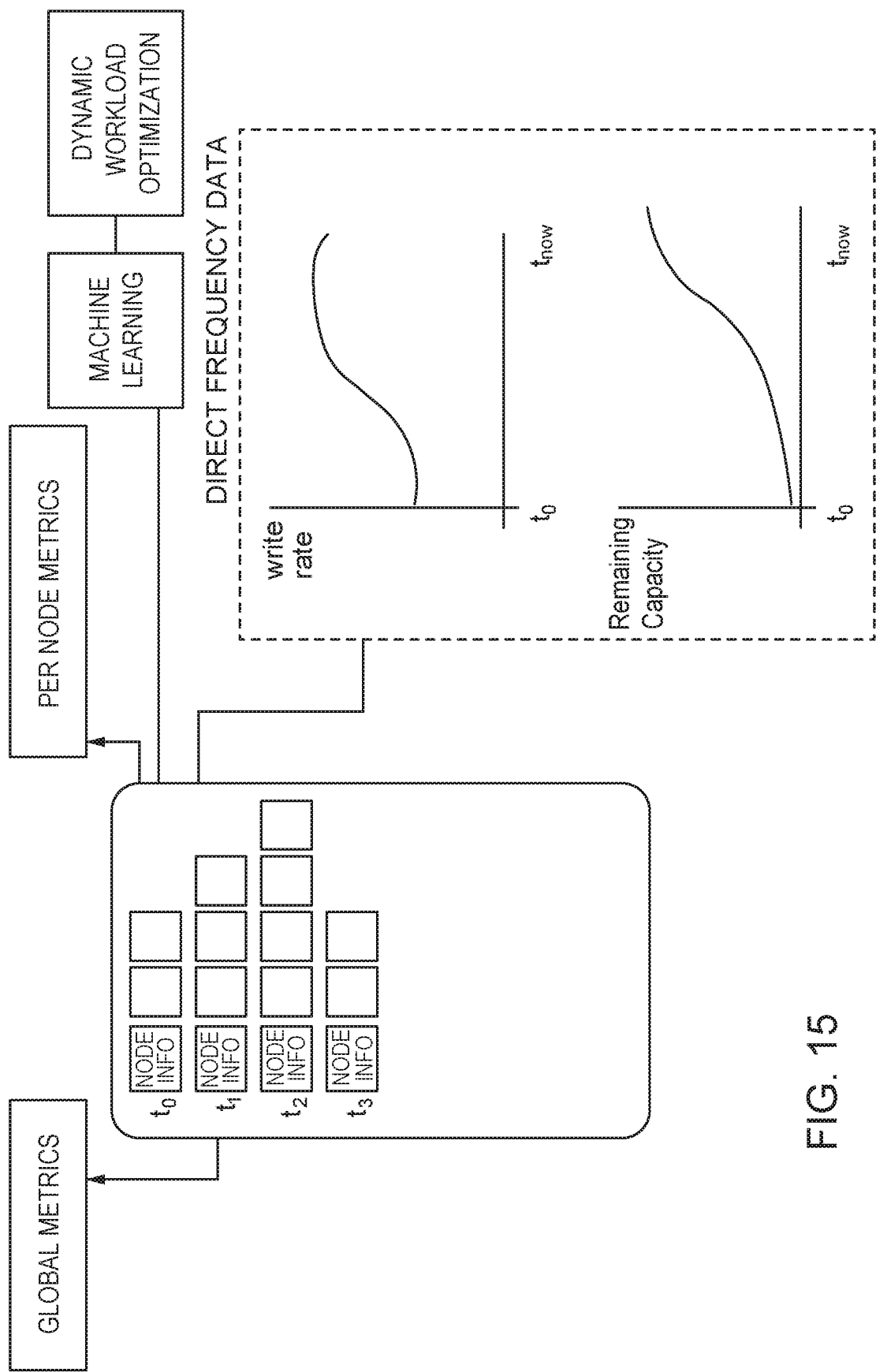
FIG. 15 is a schematic diagram illustrating the extraction of analytic data from the stream metadata.

FIG. 15 is a schematic diagram illustrating the extraction of analytic data from the stream metadata. Particularly in the node based environment, the stream has the series of write transactions that respectively correspond to each node, along with the global series of all write transactions. This provides metadata useful for performing both per-node metrics and global metrics. For example, some direct telemetry data is generated using the information, including the write rate over time, as well as used capacity over time. In addition to the direct telemetry data, machine learning is applied to the metadata to provide dynamic workflow optimization. For example, the pattern of write accesses can be monitored over time and predictions made about likely bursts of activity, such as when running end of month reports. These can be used to optimize the storage in preparation for the anticipated burst, for example by moving data to an archive medium in order to free up enough storage to accommodate the expected activity in high performance storage. Because of the fact that every write is recorded in the stream it becomes possible to perform this predictive analysis many months after the pattern started, without having to know in advance what to look for.

Thus embodiments of the present invention produce and provide a stream architecture for data representation. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for data representation comprising:
   receiving write transactions directed to a given volume; and
   retaining stream metadata corresponding to the write transactions, the stream metadata identifying a sequence of the write transactions according to the order in which the write transactions are received for the given volume, and identifying respective location information for each of the write transactions, the location information including object identifiers respectively corresponding to the write transactions, and the location information including offsets respectively corresponding to each of the write transactions.

2. The method of claim 1, further comprising:
   associating a stream image to the stream metadata, the stream image providing a representation of the data in the given volume for a point in time by referencing a non-contiguous subset of the sequence of write transactions referenced in the stream metadata.

3. The method of claim 1, wherein the object identifiers include a first object identifier corresponding to a current object.

4. The method of claim 3, further comprising:
   determining whether a current write transaction would exceed a capacity of the current object;
   identifying a next object and updating the stream metadata to reference the next object for the current write transaction, where it is determined that the current write transaction would exceed the capacity of the current object.

5. The method of claim 3, further comprising:
   determining where a current write transaction would exceed a capacity of the current object; and
   updating the stream metadata to reference the current object for the current write transaction, where it is determined that the current write transaction would not exceed the capacity of the current object.

6. The method of claim 1, wherein receiving the write transactions and retaining the stream metadata are performed in a containerized microservice.

7. A non-transitory computer readable medium storing program code for providing a containerized stream microservice, the program code being executable by a processor to perform operations comprising:
   receiving write transactions directed to a given volume; and
   retaining stream metadata corresponding to the write transactions, the stream metadata identifying a sequence of the write transactions according to the order in which the write transactions are received for the given volume, and identifying respective location information for each of the write transactions, the location information including object identifiers respectively corresponding to the write transactions, and the location information including offsets respectively corresponding to each of the write transactions.

8. The non-transitory computer readable medium of claim 7, wherein the operations further comprise:

associating a stream image to the stream metadata, the stream image providing a representation of the data in the given volume for a point in time by referencing a non-contiguous subset of the sequence of write transactions referenced in the stream metadata.

9. The non-transitory computer readable medium of claim 7, wherein the object identifiers include a first object identifier corresponding to a current object.

10. The non-transitory computer readable medium of claim 9, wherein the operations further comprise:

determining whether a current write transaction would exceed a capacity of the current object;

identifying a next object and updating the stream metadata to reference the next object for the current write transaction, where it is determined that the current write transaction would exceed the capacity of the current object.

11. The non-transitory computer readable medium of claim 9, wherein the operations further comprise:

determining where a current write transaction would exceed a capacity of the current object; and updating the stream metadata to reference the current object for the current write transaction, where it is determined that the current write transaction would not exceed the capacity of the current object.

12. The non-transitory computer readable medium of claim 7, wherein receiving the write transactions and retaining the stream metadata are performed in a containerized microservice.

13. An apparatus comprising:

a processing platform including an operating system and hosting an application container and a containerized stream microservice, the containerized stream microservice being configured to:

receive write transactions directed to a given volume by the application container; and retain stream metadata corresponding to the write transactions, the stream metadata identifying a sequence of the write transactions according to the order in which the write transactions are received for the given volume, and identifying respective location information for each of the write transactions, the location information including object identifiers respectively corresponding to the write transactions, and the location information including offsets respectively corresponding to each of the write transactions.

14. The apparatus of claim 13, wherein the object identifiers include a first object identifier corresponding to a current object.

15. The apparatus of claim 14, wherein the operations further comprise:

determining whether a current write transaction would exceed a capacity of the current object;

identifying a next object and updating the stream metadata to reference the next object for the current write transaction, where it is determined that the current write transaction would exceed the capacity of the current object.

16. The apparatus of claim 14, wherein the operations further comprise:

determining where a current write transaction would exceed a capacity of the current object; and updating the stream metadata to reference the current object for the current write transaction, where it is determined that the current write transaction would not exceed the capacity of the current object.

17. The apparatus of claim 13, wherein receiving the write transactions and retaining the stream metadata are performed in a containerized microservice.

* * * * *